US007086216B2

(12) United States Patent
Geraghty

(10) Patent No.: US 7,086,216 B2
(45) Date of Patent: Aug. 8, 2006

(54) MACHINE FOR GATHERING GROUND STREWN ARTICLES

(75) Inventor: William F. Geraghty, Cumberland, MD (US)

(73) Assignee: Rockland, Inc., Bedford, PA (US)

( * ) Notice: Subject to any disclaimer, the term of this patent is extended or adjusted under 35 U.S.C. 154(b) by 0 days.

(21) Appl. No.: 10/786,294

(22) Filed: Feb. 26, 2004

(65) Prior Publication Data

US 2005/0188667 A1 Sep. 1, 2005

(51) Int. Cl.
*A01D 43/02* (2006.01)
*A01D 87/00* (2006.01)

(52) U.S. Cl. ....................................... 56/344
(58) Field of Classification Search ............... 56/16.6, 56/12.9, 327.1, 329, 344; 15/82, 83, 84, 15/80; 414/334; 198/514, 518
See application file for complete search history.

(56) References Cited

U.S. PATENT DOCUMENTS

| 501,515 | A | * | 7/1893 | Johnson ..................... 15/84 |
| 2,751,745 | A | * | 6/1956 | Magee ....................... 56/372 |
| 3,587,814 | A | * | 6/1971 | Garabedian ................. 198/309 |
| 3,923,169 | A | * | 12/1975 | Van Drie .................... 414/334 |
| 3,946,541 | A | * | 3/1976 | Jennings ........................ 56/1 |
| 3,962,072 | A | * | 6/1976 | Ramacher et al. ........... 209/140 |
| 4,051,961 | A | * | 10/1977 | Williams .................... 414/518 |
| 4,147,017 | A | * | 4/1979 | Cortopassi et al. .......... 56/16.5 |
| 4,221,665 | A | * | 9/1980 | Decker ....................... 209/247 |
| 4,287,707 | A | * | 9/1981 | Persoons et al. ............. 56/12.8 |
| 4,335,570 | A | * | 6/1982 | Fitzmaurice ............... 56/327.1 |
| 4,921,294 | A | * | 5/1990 | Klopfenstein .............. 294/99.1 |

FOREIGN PATENT DOCUMENTS

EP 319420 A2 * 6/1989

* cited by examiner

*Primary Examiner*—Árpád Fábián Kovács
(74) *Attorney, Agent, or Firm*—Stevens, Davis, Miller & Mosher, LLP

(57) ABSTRACT

A machine for removing articles strewn on a tract of ground generally consisting of a wheel unit; a support frame mounted on the wheel unit, having means for advancing the machine along the tract of ground; an endless conveyor mounted on the support frame, having means to gather articles deposited on the tract of ground and a flight extending from a front end disposed adjacent ground level, upwardly and rearwardly to an elevated rear end; a receptacle mountable on the support frame, positioned to receive articles gathered by the gathering means, carried upwardly and rearwardly on the conveyor and discharged therein; a moldboard disposed forwardly of a lower front end of the conveyor, pivotally connected to the support frame; and means for driving the conveyor.

19 Claims, 4 Drawing Sheets

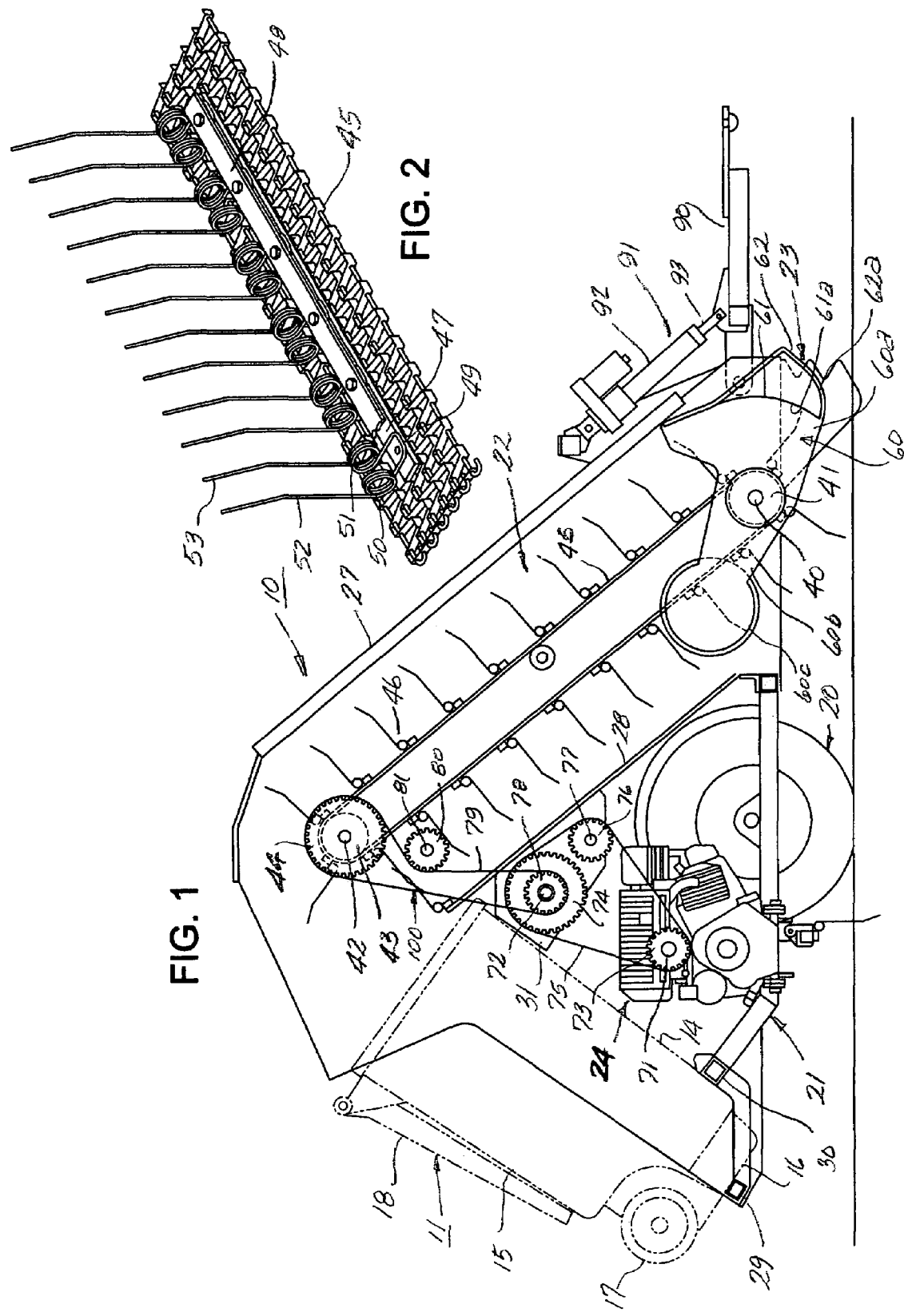

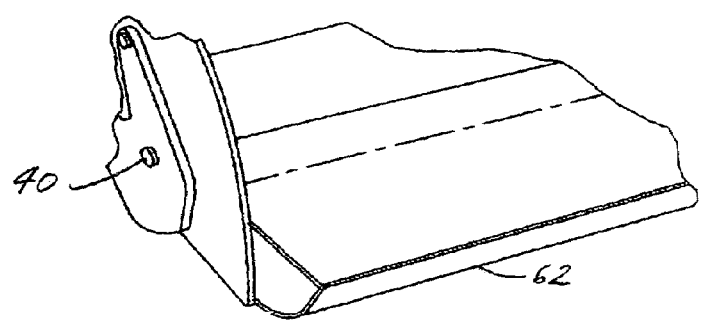
FIG. 6
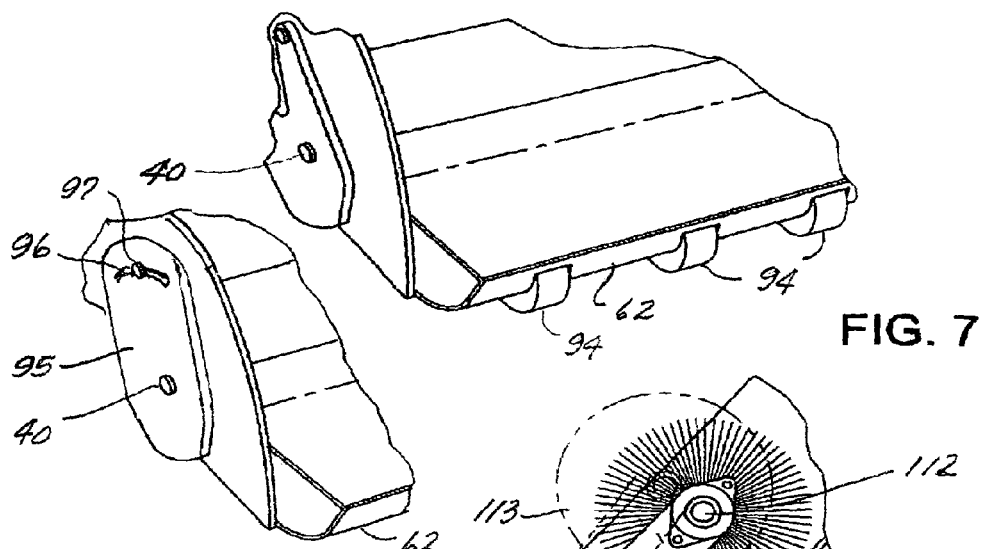
FIG. 7
FIG. 6a
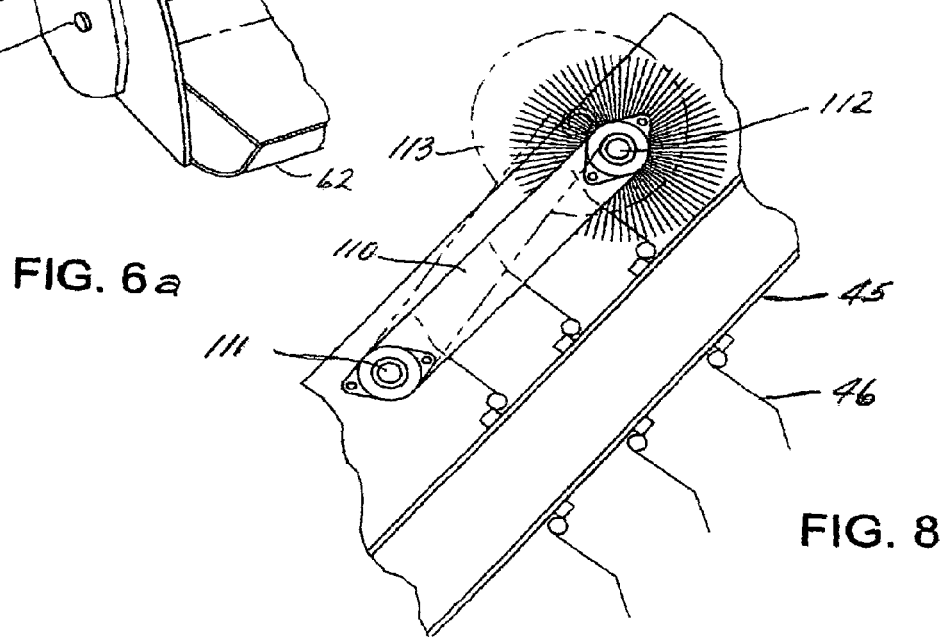
FIG. 8

MACHINE FOR GATHERING GROUND STREWN ARTICLES

This invention relates to a machine for gathering articles strewn on the ground, such as trash, debris and the like.

BACKGROUND OF THE INVENTION

Machines commonly used to gather trash, debris and other articles off of the ground generally have consisted of a wheel unit, a support frame mounted on the wheel unit, having a drawbar for towing the machine by a tractor or other vehicle, a receptacle mounted on the support frame and an endless conveyor assembly for picking up articles off of the ground, conveying them rearwardly and depositing them in the mounted receptacle which is adapted to be emptied at a selected site. Often, such machines are used to clean sandy beaches strewn with trash and debris. Such machines, however, have been found to be less than entirely effective in providing an economically manufactured machine capable of readily gathering articles strewn on the ground, usually with a certain amount of earth particles, separating the articles to be collected from the earth particles and then capturing all of the collected articles in a receptacle. A further problem with such prior art machines has been in disposing of the collected articles.

It thus is the principal object of the present invention to provide an improved machine for gathering articles strewn on the ground which is comparatively inexpensive to manufacture and operate, efficient an operation and highly effective in gathering articles off of the ground. It is a further object of the present invention to provide such an improved machine which functions to cleanly separate such earth particles from the articles being gathered, and capturing such gathered articles in a receptacle for further disposition. A still further object of the present invention is to provide such an improved machine which will accommodate commonly used, stand alone refuse bins, equipped with wheels, which may be removably mounted on such machines and filled with trash or debris gathered by such machines, readily removed from such machines and positioned at selected sites, wheeled to vicinities of trash collecting vehicles and emptied into such vehicles.

SUMMARY OF THE INVENTION

The objects of the present invention are achieved by providing a machine generally consisting of a wheel unit; a support means mounted on the wheel unit, having means for advancing the machine along a tract of ground strewn with articles such as trash, debris and the like; an endless conveyor mounted on the support frame, having means for gathering articles strewn on the ground and a flight extending from a front end disposed adjacent ground level, upwardly and rearwardly to an elevated rear end; a receptacle mountable on the support frame, positioned to receive articles gathered by the gathering means, carried upwardly and rearwardly on the conveyor and discharged therein; a moldboard disposed forwardly of the lower front end of the conveyor, pivotally connected to the support frame; and means for operating the conveyor. Preferably, the support frame is provided with support surfaces on which a receptacle may be removably seated, positioning an upper end thereof opening upwardly and forwardly for receiving articles advanced upwardly and rearwardly on a flight of such conveyor, the belt of such conveyor is perforated to permit earth particles to be sifted and thus returned to the ground, such belt is provided with a set of tines operable to impale or otherwise engage articles to gather articles off of the ground, advance them upwardly and rearwardly and deposit them in the receptacle mounted on the machine, the frame is provided with a set of stationary tines disposed adjacent the upper, rear end of the conveyor which cooperates with the set of tines provided on the conveyor to comb out debris carried on the conveyor and cause such articles to be deposited into the container, and such frame further is provided with a rotary brush cooperable with a flight of the conveyor to cause earth particles and particularly wet earth particles to be sifted through the conveyor. It further is preferred that the moldboard of such machine be provided with a skid surface or a set of wheels allowing it to move along the ground, and a counterweight to permit such skid surface or wheels to readily displace vertically to negotiate variations in the terrain being traversed by the machine.

BRIEF DESCRIPTION OF THE DRAWINGS

FIG. 1 is a side elevational view of a machine embodying the present invention;

FIG. 2 is an enlarged, perspective view of a portion of the belt of the endless conveyor assembly of the machine shown in FIG. 1;

FIG. 6 is a perspective view of a portion of the lower, front end of the machine shown in FIGS. 1, 3 and 4, illustrating the moldboard thereof FIG. 6a is a view similar to the view shown in FIG. 6, illustrating a modification of the lower, front end of the machine;

FIG. 7 is a view similar to the view shown in FIG. 6, illustrating the use of a set of wheels in lieu of a skid member; and FIG. 8 is a partial, side elevational view of the conveyor assembly shown in FIGS. 1, 3 and 4, further illustrating the use of a rotary brush cooperating with an upper flight of such conveyor assembly.

DETAILED DESCRIPTION OF THE PREFERRED EMBODIMENTS OF THE INVENTION

Figure 3:
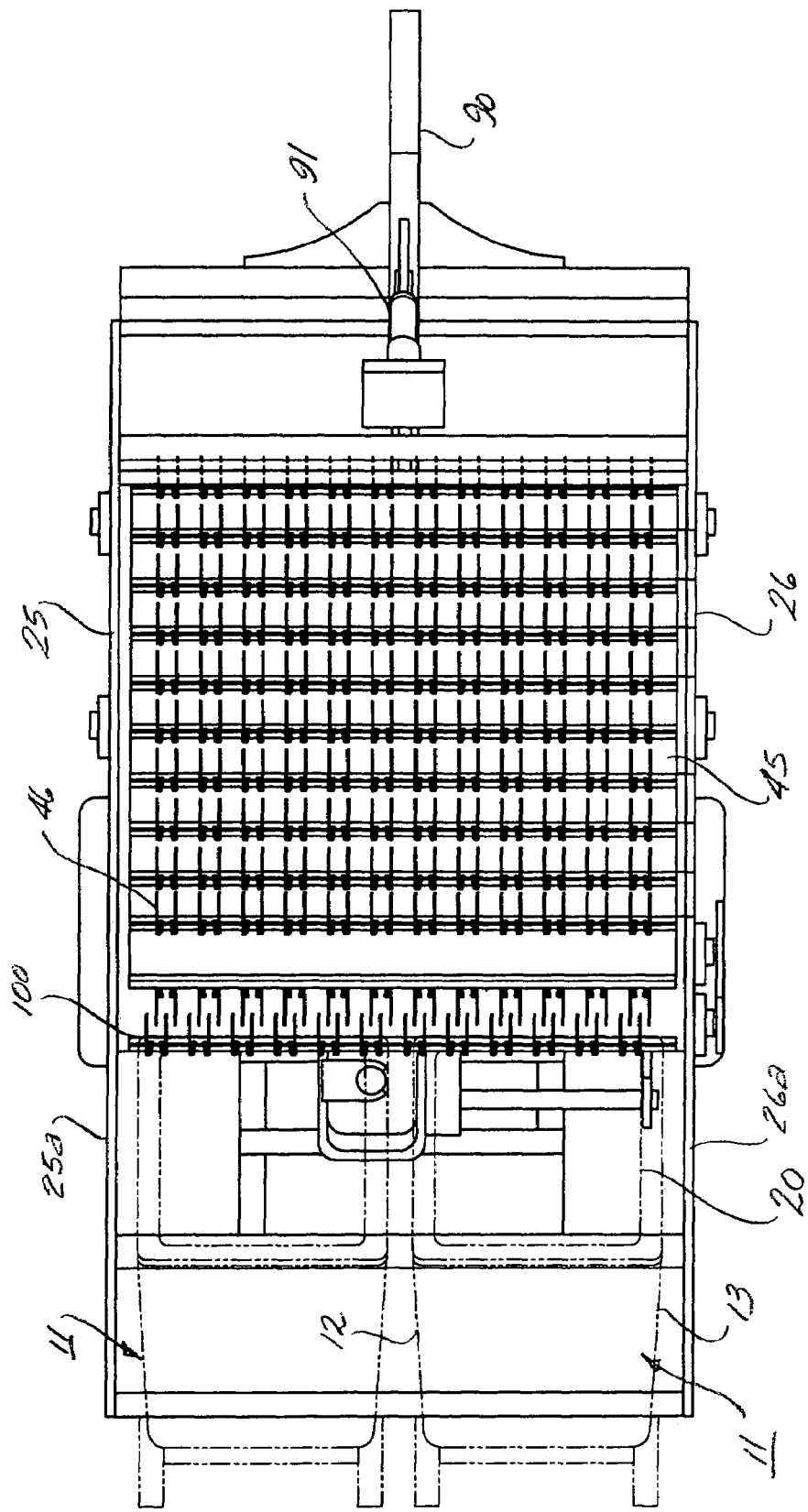
FIG. 3 is a top plan view of the machine shown in FIG. 1.
Figure 4:
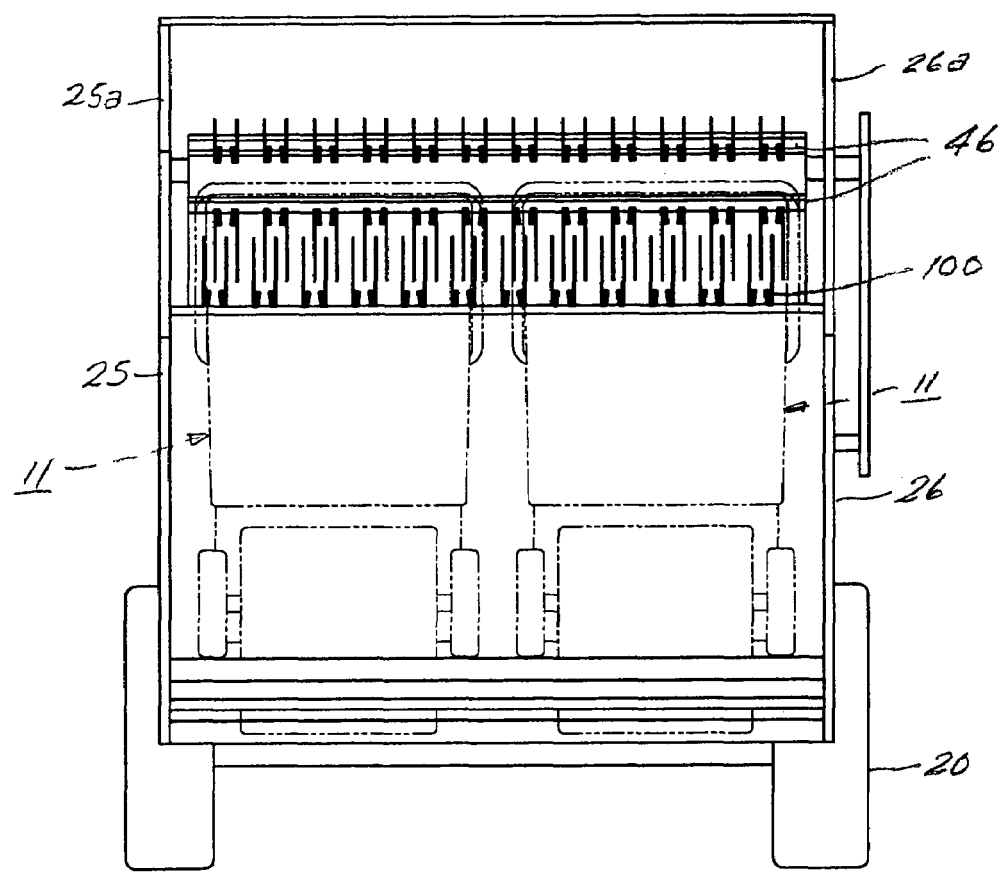
FIG. 4 is a rear elevational view of the machine shown in FIGS. 1 and 3.

Referring to the drawings, there is illustrated a machine 10 operable for gathering articles such as trash, debris and the like strewn on the ground, and depositing such articles in a pair of bins 11 removably mounted thereon. Each of such bins is provided with a pair of side walls 12 and 13 and front and rear walls 14 and 15 defining an upper open end, a bottom wall 16, a wheel unit 17 disposed adjacent the rear and bottom walls thereof and a lid 18 hinged to the upper end of the rear wall and pivotal between an open position as shown in FIG. 1 and a position covering the upper open end of the bin. Such type of bin is commonly used by refuse collection companies, distributed to residences and commercial establishments for depositing refuse, transportable from residential and commercial sites to collection sites and adapted to be emptied into refuse collection vehicles, periodically transported along defined routes in municipalities.

Machine 10 generally includes a wheel unit 20, a support frame 21, a conveyor assembly 22, a moldboard 23 and an engine 24. The wheel unit consists of a conventional set of wheels mounted on an axle. The support frame is supported on the wheel unit and includes a pair of side walls 25 and 26, an upper wall 27 and a lower wall 28 spaced from upper wall 27 and interconnecting the side walls to define a space in which the conveyor assembly is mounted. The rear end of the support frame on which a pair of bins 11 may be removably mounted includes a crossbeam member 29 providing a surface on which bottom wall 16 of the bins may be positioned, and a crossbeam 30 and a set of plates 31 secured to the underside of wall member 28, providing surfaces on which the front walls of bins mounted on the machine may be positioned. As best seen in FIG. 1, the surfaces of members 29, 30 and 31 are arranged so that bins mounted on the rear end of the machine will be tilted forwardly having the upper ends thereof opening upwardly and forwardly, communicating with the space in which the conveyor assembly is mounted. The upper rearwardly facing edges 25a and 26a of the side walls of the frame are of a length and are disposed at an angle to permit the lids 18 of a pair of bins 11 mounted on the rear end of the machine to be pivoted upwardly and forwardly and rest on such edges to provide an essentially closed channel from the spaced occupied by the conveyor assembly to the interiors of such bins.

Conveyor assembly 22 includes a lower, transversely disposed shaft 40 journaled in bearing blocks mounted on the side walls of the frame, having a cylindrical roller 41 mounted thereon, and an upper, transversely disposed shaft 42 journaled in bearing blocks mounted on the side walls of the frame having a cylindrical roller 43 mounted thereon and also a sprocket 44. Trained on rollers 41 and 43 is a conveyor belt 45 which is of a chain link or woven construction providing a plurality of openings therethrough. Mounted on the outer side of such belt is a plurality of longitudinally spaced, transversely disposed tine assemblies 46. As best shown in FIG. 2, each of such assemblies includes a base strip 47 and a retainer strip 48 secured to the belt and a plurality of tine units secured between such strips, spaced along such strips and having portions projecting substantially perpendicularly from belt 45. Each of such tine units consists of a metal wire bent at a center thereof to form a U-shaped center portion 49, having the leg segments of such U-shaped portion contoured into spiral, spring portions 50 and 51 and having the spiral spring portions continuing as free ends 52 and 53 disposed substantial tangentially to the spiral spring portions 50 and 51. Each of the base strips is disposed on the inner side of the conveyor belt, each of the retainer strips is mounted on the outer side of the conveyor belt in alignment with a base strip, each of the U-shaped portions of the tine units is interposed between the conveyor belt and a retainer strip and the tines are fixed in position by a set of bolts extending through openings in each retainer strip and openings in the conveyor belt and threaded into the base strip.

Moldboard 23 includes a pair of arm sections 60, 60, each pivotally mounted on an end portion of shaft 40 and having a front end portion 60a and a rearwardly extending portion 60b. Interconnecting front end portions 60a, 60a is a transversely disposed section 61 having a rearwardly facing, curved surface 61a partially disposed radially relative to the axis of shaft 40. Projecting forwardly from the lower end of transverse member 61 is a curved section 62 providing a curved, bottom skid surface 62a, and an upper plate section 63 connecting the forward end of plate section 62 to the upper end of transverse section 61. Curved surface 61a is spaced from the axis of shaft 40 a sufficient distance to permit the ends of tines 46 to extend to yet clear such surface. Formed on each rearwardly extending portion 60b of each arm section is a counterweight 60c which counterbalances the front end of the moldboard to permit it to float, displace vertically and thus permit skid surface 62a to engage the ground and negotiate different terrain.

Motor 24 is an internal combustion engine having sufficient horsepower to drive the conveyor assembly. It is provided with an output shaft 71 which transmits drive to an intermediate shaft 72 by means of a drive sprocket 73, a driven sprocket 74 and a drive train 75. An adjustable idler sprocket 76 mounted on a shaft 79 further is provided to remove any slack in drive chain 75. Drive from intermediate shaft 72 to conveyor shaft 42 is provided by a sprocket 78 mounted on shaft 72, a drive chain 79 and sprocket 43 mounted on shaft 42. An idler sprocket 80 mounted on a shaft 81 further is provided for taking up any slack in drive chain 79.

The machine as described is intended to be towed by a tractor or another suitable vehicle. For this purpose, there is provided a drawbar 90 pivotally connected to the front end of the support frame and having a conventional attachment means at the free end thereof for detachably securing the drawbar to the prime mover. To adjust the level of the front end of the frame and particularly the moldboard mounted on the frame is a cylinder assembly 91 including a cylinder member having the base end thereof pivotally connected to upper wall 27 and a rod member 93 pivotally connected to a bracket provided on the drawbar. It will be appreciated that when the drawbar is connected to a towing vehicle and cylinder assembly 91 is operated, the front end of the support frame may be displaced vertically to position the moldboard at an appropriate level.

The machine as described particularly is adapted to accommodate the use of trash bins 11 which are commonly and widely used to accumulate trash and refuse at residential and commercial facilities and transfer them to curbsides for empting into refuse collection vehicles. In the embodiment described, two of such trash bins may be mounted on the rear end of the machine.

Figure 5:
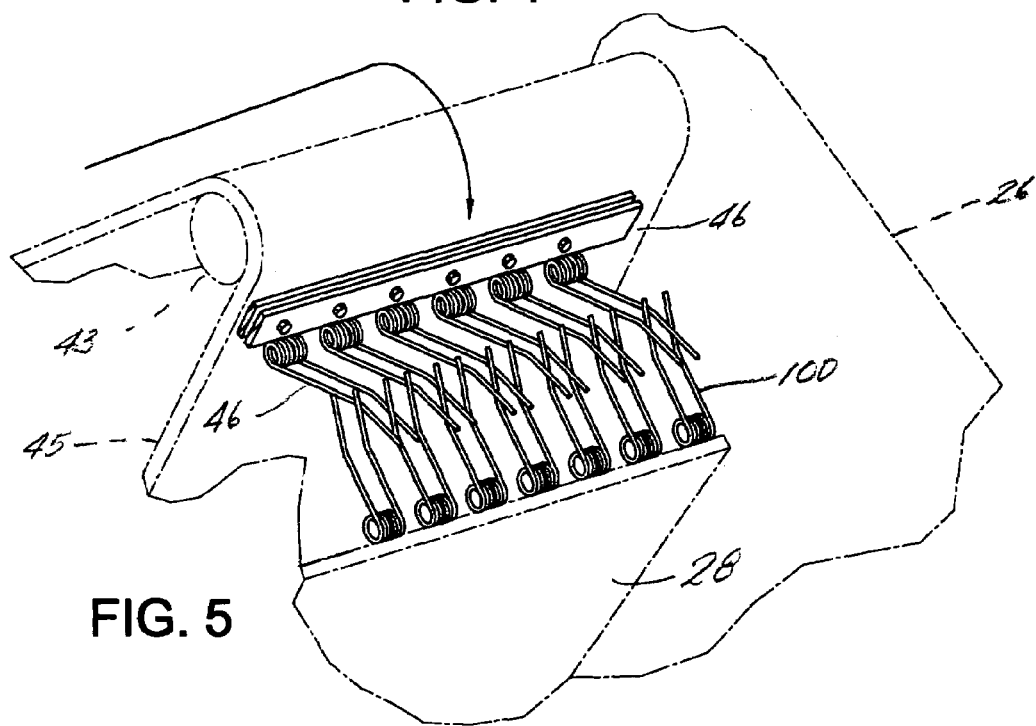
FIG. 5 is an enlarged, partial perspective view of a portion of the machine shown in FIGS. 1, 3 and 4, illustrating the manner of cooperation of the conveyor and frame supported tines in detaching articles carried by the conveyor tines.

In the use of the machine to perhaps clean a tract of ground along a sandy beach, the machine is first attached to a tractor or other towing vehicle, a pair of trash bins 11 are manually lifted and positioned on the rear end of the machine as shown in FIG. 1 with the lids thereof either in the open position as shown in FIG. 1 or pivoted forwardly to engage side wall edges 25a and 26a, and cylinder assembly 91 is operated to set the moldboard at a proper level to permit the moldboard to skim along the ground as the tines of the conveyor assembly traverse along a circular path at the lower end of the assembly to comb through the sandy ground and either impale or otherwise engage trash or debris strewn on the ground and transport such articles upwardly and rearwardly along the upper flight of the conveyor belt. The motor is then started to drive the conveyor belt. The speed of the belt may be set to run at a constant speed or a control mechanism positioned at the operator's station on the towing vehicle may be used to vary such speed. Once the level of the moldboard has been adjusted and the engine is operating at the desired speed, the towing vehicle may be operated to tow the machine over the tract of ground to be cleaned. As the machine is advanced, the lower end of the moldboard will skid over the ground and displace vertically to negotiate the terrain, and the tines traversing about the lower end of the conveyor assembly will penetrate a short distance into the ground to impale or otherwise engage and carry articles along the ground surface upwardly and rearwardly to be discharged into the trash bins at the rear end of the machine as such tines traverse about the upper end of the conveyor assembly. As the tines move along the upper flight of the conveyor belt, sand and other small particles picked up by the tines or articles being gathered will be caused to fall through the openings in the conveyor belt and return to the ground. To assure the removal and discharge of articles picked up by the tines, a set of stationary tines 100 is provided on the upper end of wall 28 which extend upwardly and forwardly into the path of tines 46, as shown in FIG. 5, to comb any articles lodged on or otherwise attached to movable tines 46. When the trash bins have been filled, the machine may then be towed to firmer ground where the bins may be manually removed from the machine and left at a pickup location or wheeled to such an area where they may be emptied into a refuse collection vehicle in the conventional manner.

In lieu of a skid member provided on the moldboard for negotiating the terrain over which the machine is towed, the moldboard may be provided with a set of wheels 94 as shown in FIG. 7. In addition, where the ground may be wet such as on a beach a rotary brush as shown in FIG. 8 may be employed to assure the expulsion of such particles through the openings in the conveyor belt. Such rotary brush assembly would include a pair of support arms 110, 110 pivotally mounted on a transversely disposed shaft 111 journaled in bearing blocks mounted on the side walls of the support frame above the upper flight of the conveyor belt, a transversely disposed shaft 112 journaled in bearing blocks disposed on the free ends of arm members 110, 110 and a rotary brush 113 mounted on shaft 112. The pivotal connection of the arm members thereof allows the brush to displace relative to the upper flight of the conveyor to negotiate any articles being conveyed by the belt and clumps of earth particles to be broken up and discharged through the openings in the conveyor belt. Such a rotary brush may be optionally used with a conveyor belt with or without a set of tines as described. In arrangements employing such tines, the flexibility of the tines and the bristles of the brush would permit the tines to easily pass through the brush.

In addition to allowing the moldboard to float about the pivotal axis thereof, means may be provided to fix the angular displacement of the moldboard relative to the pivotal axis thereof. Such an arrangement may include a radial arm section 95 having a slot 96 spaced radially relative to the pivotal axis thereof, and a bolt 97 having a threaded shank portion extending through such slot and threaded into a threaded hole in a support frame component and a head portion engageable with the arm section, as shown in FIG. 6*a*.

Because of the simplicity of the machine as described and the use of conventional trash bins widely available, the manufacturing cost of the machine is comparatively inexpensive. Furthermore, the dozing function of the moldboard, the scooping capabilities of the tines of the conveyor assembly, the combing action of the stationary tines cooperating with the moving tines and possibly the use of a rotary brush on the upper flight of the conveyor belt assures a complete and efficient gathering and collecting of trash, debris and other articles from a tract of ground sought to be cleaned, and the return to the ground of any earth particles entrained in the gathering process.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

I claim:

1. A machine for removing articles such as debris and the like strewn on a tract of ground, comprising:
   a wheel unit;
   a support frame mounted on said wheel unit, having means for advancing said machine along said tract of ground;
   an endless conveyor mounted on said support frame, having means for gathering articles deposited on said tract of ground, said gathering means being mounted to said conveyor and positioned to touch the ground, and a flight extending from a front end disposed adjacent ground level, upwardly and rearwardly to an elevated rear end, wherein a lower-most portion of said endless conveyor is positioned proximal said advancing means and an upper-most portion of said endless conveyor is positioned distal said advancing means;
   a receptacle mountable on said support frame, positioned to receive articles gathered by said gathering means, carried upwardly and rearwardly on said conveyor and discharged therein;
   a moldboard disposed forwardly of a lower front end of said conveyor, pivotally connected to said support frame, wherein said moldboard is positioned to push the articles; and
   means for driving said conveyor.

2. A machine according to claim 1 wherein said moldboard extends transversely.

3. A machine according to claim 1 wherein said moldboard is pivotal about a transverse axis.

4. A machine according to claim 1 wherein said moldboard is provided with a skid surface.

5. A machine according to claim 1 wherein said moldboard is provided with a set of ground engageable wheels.

6. A machine according to claim 1 wherein said moldboard is provided with a ground engageable end disposed on one side of its pivot axis and a counterweight end disposed on an opposite side of said pivot axis.

7. A machine according to claim 1 wherein said means for advancing said machine comprises a drawbar connected to said machine and connectable to a prime mover.

8. A machine according to claim 1 wherein said endless conveyor is perforated.

9. A machine according to claim 1 wherein said endless conveyor is of a chain link construction.

10. A machine according to claim 1 wherein said endless conveyor is provided with a set of tines engageable with articles deposited on the ground for gathering and conveying said particles to said receptacle.

11. A machine according to claim 10 including a set of tines supported on said support frame adjacent said receptacle and cooperable with said first mentioned set of tines to remove said articles therefrom and cause them to be discharged into said receptacle.

12. A machine according to claim 11 wherein said first mentioned set of tines comprises a plurality of longitudinally spaced transversely disposed rows of tines, and said second mentioned set of tines comprises a transversely disposed row of tines which function to comb articles out of said rows of first mentioned set of tines.

13. A machine according to claim 1 wherein said support frame includes at least one seating surface, and said receptacle comprises a removable bin which may be positioned on said seating surface.

14. A machine according to claim 13 wherein said bin is provided with an access opening disposable adjacent said second mentioned set of tines when positioned on said seating surface.

15. A machine according to claim 13 wherein said bin include a set of wheels and a hinged cover.

16. A machine according to claim 1 including a rotary brush supported on said support frame and cooperating with said upper flight of said conveyor.

17. A machine according to claim 16 wherein said endless conveyor is perforated and said brush cooperates with said upper flight to cause earth particles to be screened through said flight.

18. A machine according to claim 17 wherein said gathering means comprise a set of tines.

19. A machine according to claim 18 wherein said brush is rotatable about a transverse axis spaced from said upper flight a distance sufficient for said tines to pass through bristles of said brush.

* * * * *